United States Patent
Schüler et al.

(10) Patent No.: US 12,195,071 B2
(45) Date of Patent: Jan. 14, 2025

(54) CHASSIS CYLINDER FOR AN INDUSTRIAL TRUCK WITH A DRIVE WHEEL PRETENSIONED AGAINST THE GROUND

(71) Applicant: Jungheinrich Aktiengesellschaft, Hamburg (DE)

(72) Inventors: Michael Schüler, Wakendorf II (DE); Richard Schwarz, Hamburg (DE); Melanie Schefner, Hamburg (DE); Marcel Krenzin, Bad Bramstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 143 days.

(21) Appl. No.: 17/828,180

(22) Filed: May 31, 2022

(65) Prior Publication Data

US 2022/0379941 A1   Dec. 1, 2022

(30) Foreign Application Priority Data

May 31, 2021   (DE) ...................... 10 2021 114 066.8

(51) Int. Cl.
*B62B 3/06*   (2006.01)
(52) U.S. Cl.
CPC ........ *B62B 3/0618* (2013.01); *B62B 2301/04* (2013.01); *B62B 2301/08* (2013.01); *B62B 2301/23* (2013.01)
(58) Field of Classification Search
CPC .............. B62B 3/0618; B62B 2301/04; B62B 2301/08; B62B 2301/23; B66F 9/22; B66F 9/07586; B66F 9/06; B66F 9/07513; B66F 9/07559; B66F 9/07568; B66F 9/07572; B60G 2204/4605; B60G 2300/022; B60G 17/005
See application file for complete search history.

(56) References Cited

U.S. PATENT DOCUMENTS 4,750,579 A * 6/1988 Jarl ...................... B66F 9/07586
                                                                    180/209
10,514,050 B2 * 12/2019 Revenus ............... F15B 15/149

FOREIGN PATENT DOCUMENTS

| DE | 102005032660 | 1/2007 |
|----|--------------|--------|
| EP | 0583546 A1 | 2/1994 |
| EP | 1555238 A2 | 7/2005 |
| EP | 2163456 A2 | 2/2010 |
| EP | 2354078 A1 | 8/2011 |
| JP | 2000052734 A | 2/2000 |

OTHER PUBLICATIONS

EP Application No. 20220176223 ; filed May 30, 2022; EP Office Action dated Oct. 28, 2022 (8 pages).
DE Application No. 10 2021 114 066.8; filed May 31, 2021; German Search Report dated Jan. 11, 2022 (7 pages).

* cited by examiner

*Primary Examiner* — Paul N Dickson
*Assistant Examiner* — Shams Dhanani
(74) *Attorney, Agent, or Firm* — Barclay Damon LLP

(57) ABSTRACT

An industrial truck includes a vehicle frame and a drive unit. The drive unit includes a drive wheel movably mounted to the vehicle frame and a spring unit. The spring unit includes a hydraulic cylinder positioned between the vehicle frame and the drive unit and a switchable valve configured to define a blocked state. The spring unit is configured to pretension the drive wheel against a ground surface. When the switchable valve is in the blocked state, a one-sided movement of the hydraulic cylinder is blocked.

16 Claims, 15 Drawing Sheets

CHASSIS CYLINDER FOR AN INDUSTRIAL TRUCK WITH A DRIVE WHEEL PRETENSIONED AGAINST THE GROUND

CROSS REFERENCE TO RELATED INVENTION

This application is based upon and claims priority to, under relevant sections of 35 U.S.C. § 119, German Patent Application No. 10 2021 114 066.8, filed May 31, 2021, the entire contents of which are hereby incorporated by reference.

TECHNOLOGICAL FIELD

The present invention relates to an industrial truck that has a vehicle frame on which a drive unit with a drive wheel is movably mounted vertically. The drive wheel is pretensioned against the ground or ground surface by a spring unit.

BACKGROUND

A bearing for a pretensioned drive wheel is known from U.S. Pat. No. 4,750,579 in which a chassis cylinder is combined with a mechanical spring element. A stop valve is clamped between a lift cylinder and the chassis cylinder of the drive wheel. The stop valve is designed to block the chassis cylinder when the load is lifted by more than one meter, whereas it is otherwise kept depressurized.

An industrial truck with a drive system is known from EP 1 555 238 B1 in which the driven wheel is dampened with a hydraulic damper in addition to a spring assembly. The characteristic of the damper is configured such that the working characteristic is steep, whereas the relaxation characteristic is flat so that the re-setting of the drive wheel can be relatively quick with a minimum collapse, and continuous ground contact is retained.

A holder for a drive wheel is known from EP 2 354 078 A1 in which the drive wheel is guided along two vertical rods. By means of a chassis cylinder, there is an elastic connection along a drive wheel holder that can be moved on the vertical rods. This means that, due to the elasticity even when the vertical movement stops, a limited mobility of the drive wheel in the direction of the vehicle and in the direction of the ground is retained.

A chassis for an industrial truck is known from EP 2 163 456 A2 that has a driven wheel and support rollers on each side of the drive wheel. The support rollers and/or the drive wheel are friction-locked with the ground or ground surface by means of a support cylinder, wherein a lift cylinder provided to lift the load is connected to the support cylinder by a pressure gradient valve.

The above approaches always implicitly assume a sufficient drive axle load for the design of the drive wheel load, which depends on the total vehicle mass and the position of its center of gravity. The size of the drive axle load is important in designing a chassis with respect to traction capacity and lateral stability since there is always a distribution between the drive wheel and one or more laterally arranged support wheels. If the weight of the vehicle changes in a modern industrial truck, for example from the use of lithium-ion batteries instead of the conventional lead-acid batteries (the weight reduction is about 200 kg), the applied force of the drive wheel must also be correspondingly adapted for the traction capacity and required lateral stability of the vehicle.

BRIEF SUMMARY OF THE INVENTION

The object of the invention is therefore to provide an industrial truck with a drive wheel pretensioned against the ground which ensures the necessary drive wheel load with respect to traction, as well as sufficient lateral stability under vehicle-related conditions of use.

The industrial truck according to the invention possesses a vehicle frame on which a drive unit with a drive wheel is movably mounted. The drive unit is pretensioned against the ground by a spring unit. According to the invention, the spring unit has a hydraulic cylinder and a switchable valve. In its closed position, the switchable valve blocks the movement of the drive wheel in the direction of the hall floor. The activation of blocking is independent of the current vertical position of the drive wheel that continuously adapts to a continuously changing height profile of the hall floor while driving.

In one preferred embodiment, the cylinder is designed as a dual-acting cylinder. There are two embodiments of dual-acting cylinders; in one of them, the piston rod exits the cylinder housing on both sides, and in the second one, it only exits on one side. Independent of the chosen embodiment, the piston chambers are hydraulically connected to each other.

In a preferred embodiment, the two piston chambers of the dual-acting cylinder can be separated from each other by a switchable valve. By switching the valve to the blocked state, one of the two piston chambers is hydraulically blocked such that the movement of the drive wheel is blocked in the direction of the hall floor.

In an embodiment, a throttle unit is also provided in the dual-acting cylinder by means of which a flow of fluid into or out of one of the piston chambers is throttled in order to slow down the corresponding movement of the hydraulic cylinder piston. The throttle unit operates when none of the piston chambers of the hydraulic cylinder is blocked. In this case, there is an exchange of hydraulic fluid between the chambers via the throttle unit, wherein the movement of the drive wheel can be controlled in a time-dependent manner. In the cylinder design in which the piston exits on both sides, the effective piston area of both piston chambers is the same, and therefore the displaced or drawn oil volume is identical. This cylinder design can therefore operate closed and independently without being connected to other hydraulic components. With the cylinder design in which the piston exits on one side, the effective piston areas of the piston chambers are different, however; the area on the side where the piston exits the cylinder is less by the circular area of the piston rod. Consequently, the aforementioned oil volumes of the piston chambers no longer match each other, and the corresponding oil difference must be supplied to or removed from the cylinder unit.

One advantageous embodiment of the cylinder design with a one-sided piston exit is therefore the hydraulic connection of the piston chamber with no exiting piston rod to the lift cylinder of the load lifting device. The picked up payload rests on the so-called load lift cylinder; the hydraulic connection is free of stop valves and can therefore provide or receive the aforementioned oil volumes as required, such as from a reservoir. This moreover results in the drive wheel load increasing by a load-proportional additional force. When the valve is in a blocked state with this cylinder design, another advantage is that a piston stroke opposite the blocked direction, i.e., a lifting of the drive wheel from the floor level, is possible. This is based on the physical property that minute amounts of air bubbles in the fluid enlarge extremely under negative pressure; this occurs in the piston chamber when the piston rod exits. The oil from the other piston chamber can now be drained into the load lift cylinder despite the blocked valve. Consequently when the cylinder unit is blocked, the drive wheel can traverse very uneven ground without significant shock loads.

In one possible embodiment, a load-dependent system pressure is applied to at least one of the two piston chambers in a first operating state of the vehicle. Furthermore, a second operating state can be provided in which the blocked state of the valve is opened.

In an embodiment, the spring element is parallel-connected to the hydraulic cylinder and is mechanically pretensioned and generates the drive wheel load necessary to operate the vehicle that is not provided hydraulically by the cylinder unit.

The underlying object of the invention is also achieved by an industrial truck having a vehicle control that can actuate a switchable valve in a spring unit for a drive wheel. The valve is opened when a safe operating state has been recognized, wherein the safe operating state is recognized when a vehicle steering angle does not exceed a predetermined value for straight-ahead driving, and/or a lifting height of a load carrying means of the industrial truck does not exceed a predetermined value of a transport height. The valve is opened in a safe operating state preferably so that the lift of the drive unit can readapt to the particular ground conditions. When the cylinder is blocked, the drive unit cannot follow below-floor ground depressions. This approach is diametrically opposed to the approach from the prior art, for example U.S. Pat. No. 4,750,579, where the hydraulic valve is opened when a hazardous operating state exists in which a load has been lifted above a certain height.

In an embodiment, the vehicle control opens the valve when the safe operating state has been recognized for a predetermined minimum period, and/or a predetermined minimum distance, and/or a predetermined number of drive wheel rotations. The valve can also be opened when a predetermined speed has been undershot.

In a preferred embodiment, for the traction capacity of the industrial truck, at least one vertically sprung support roller is provided whose spring path is tailored to normally navigable dip depths and traversable vehicle threshold heights. The navigable dip depth and the traversable threshold height do not have to be the same size in this case, and can for example lie within the range of a few centimeters.

In an embodiment, two preferably unsprung support rollers are provided that are arranged on a torsion bar. The movement of the support rollers is linked by the torsion bar. The torsion bar is also pressed in the direction of the hall floor by spring elements which are supported on the frame on the vehicle side. Consequently, the support wheels, which are unsprung per se, in combination with the torsion bar are nonetheless connected to the vehicle frame in a vertically sprung manner. The support forces are exchanged between the support rollers via the torsion bar.

BRIEF DESCRIPTION OF THE DRAWINGS

The embodiment according to the invention will be further described in the following with reference to exemplary embodiments. In the figures.

DETAILED DESCRIPTION OF THE INVENTION

Figure 1A:
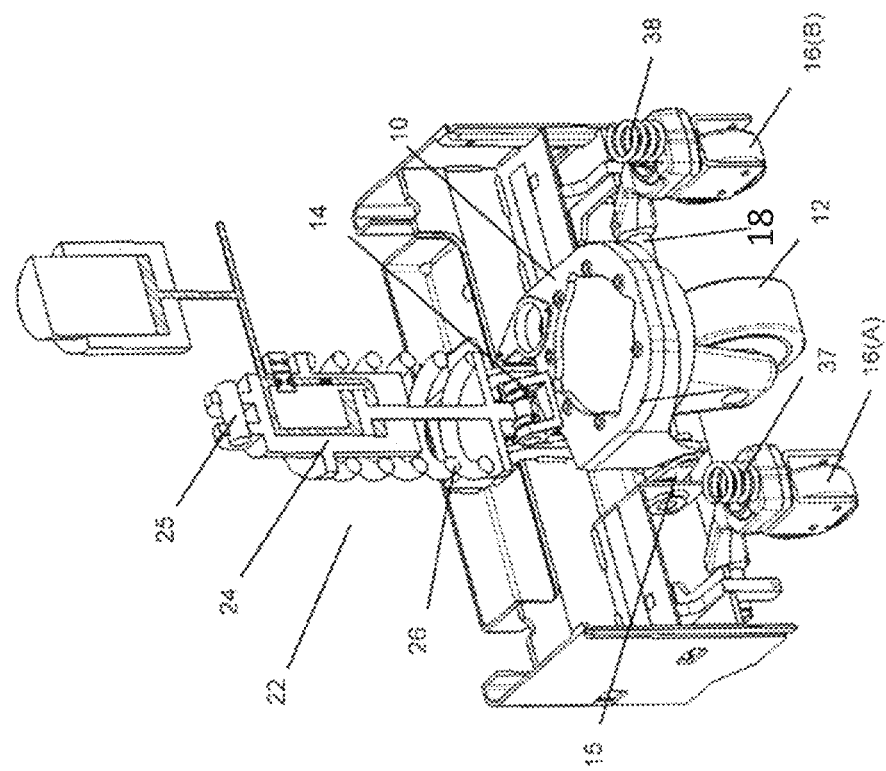
FIG. 1A illustrates a partial sectional view of an embodiment of a drive element with a drive wheel that is pretensioned against the ground by a spring unit when a valve is not energized.
Figure 1B:
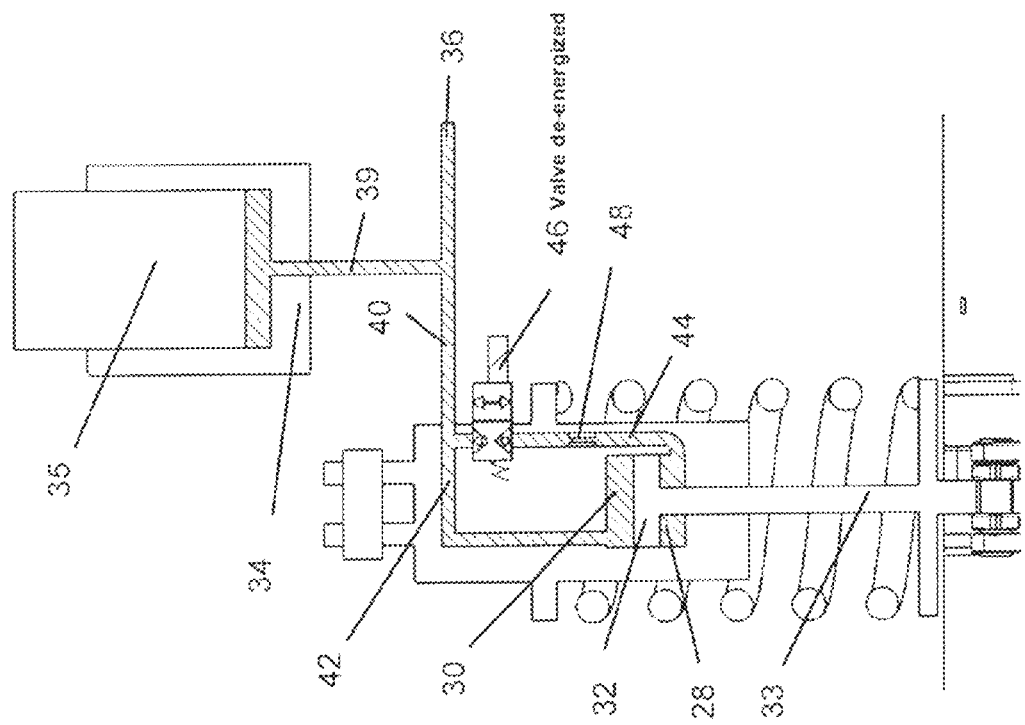
FIG. 1B illustrates a close-up view of a portion of FIG. 1A.

Referring to FIGS. 1A and 1B, a drive unit 10 with a steered and driven wheel 12 is generally shown. A vertical lift is enabled by two steering assemblies 14 and 15 that connect the drive unit 10 to the vehicle frame. The drive motor which is usually above the drive wheel 12 is not shown for the sake of clarity. On the side of the drive wheel 12, there are support rollers 16A and 16B which are mounted on a torsion bar 18 in a freely pivotable manner. The torsion bar 18 is in turn pivotably mounted about a horizontal axle in the vehicle frame. Spring elements (such as spiral springs) 37, 38 are arranged on the torsion bar holders and are pretensioned against the vehicle frame (frame-side bearing not shown) and thereby press the support wheels 16 against the hall floor. The drive unit 10 possesses a spring unit 22 that has a dual-acting hydraulic cylinder 24. Arranged parallel to the chassis cylinder 24 is a spring element 26 designed as a spiral spring that, as shown here, indirectly applies force to the drive support 10 of the cylinder piston rod 33, but generally can also act directly thereupon. The dual-acting hydraulic cylinder 24 includes a piston chamber 28 and a piston chamber 30 as shown in FIG. 1B. The piston chambers 28 and 30 are separated from each other by a piston 32. The hydraulic cylinder 24 acts between the vehicle frame (upper articulation point for the shaft 25 in the frame not shown) and the drive unit 10 and therefore influences the wheel load of the drive wheel 12. If the piston rod 33 is extended, the drive wheel load increases, and therefore the pressure of the drive wheel 12 on the floor, provided that there can be a distribution of the wheel load between the support rollers 16 and the drive wheel 12 (the sum of the wheel loads of the drive wheel 12 and the support wheels 16 corresponds to the drive axle load which results from the overall vehicle mass and the position of the overall vehicle center of gravity relative to the center distance. The drive wheel load is therefore a constant quality for a given vehicle load).

The hydraulic circuit is also schematically portrayed in FIG. 1B. Proceeding from a pump 36, the load lift cylinder 34 is supplied with hydraulic fluid (the pump and the valve group for lifting and lowering the load lift cylinder are not shown). A line 40 runs from the connecting line 39 of the load lift cylinder 34 to the dual-acting cylinder 24. The line 40 is divided into a first feedline 42 to the piston chamber 30, and into a second feedline 44 to the piston chamber 28. A switchable valve 46 and a throttle apparatus 48 are provided in the second feedline 44. The feedlines 42, 44 to the piston chambers 28, 30 are the only feedlines to the piston chambers of the dual-acting hydraulic cylinder 24 (FIG. 1A).

The piston chamber 30 of the cylinder 24 (FIG. 1A) is therefore inseparably hydraulically connected to the load lift cylinder 34 of the load lifting device. As shown in FIG. 1B, the load lift cylinder 34 is securely attached by its housing to the vehicle frame and lifts the load unit (not shown) of the vehicle by its piston rod 35. By means of a lever construction (known per se), the initial lift is converted into a lifting of the fork tines of the load unit nearly parallel to the floor; the payload is therefore lifted off of the floor to be transported. As the load is picked up, a load-dependent pressure is established in the load lift cylinder 34. The above-described hydraulic connection causes this pressure to now also be effective in the piston chamber 30 proportional to the payload mass.

FIG. 1B shows a position in which the valve 46 is switched to its blocked state. In the shown embodiment, this is done by a de-energized valve 46. In the blocked state, the piston chamber 28 is blocked. Consequently, a further extension of the piston rod 33 is impossible since the hydraulic fluid cannot be compressed. In the shown embodiment from FIG. 1B, the piston chamber 30 is inseparably connected to the load lift cylinder 34 so that the piston rod 33 can move into the hydraulic cylinder 24. The associated enlargement of the piston chamber 28 is possible since it can enlarge its volume even without receiving hydraulic fluid (this situation has already been discussed above). Occasionally, this is also termed "vacuum drawing".

In summary, FIGS. 1A and 1B shows a state in which the hydraulic cylinder 24 is hydraulically blocked to a one-sided movement of the drive wheel 12. A movement of the piston rod 33 out of the hydraulic cylinder is impossible because of the blocked position of the valve 46.

Figure 2A:
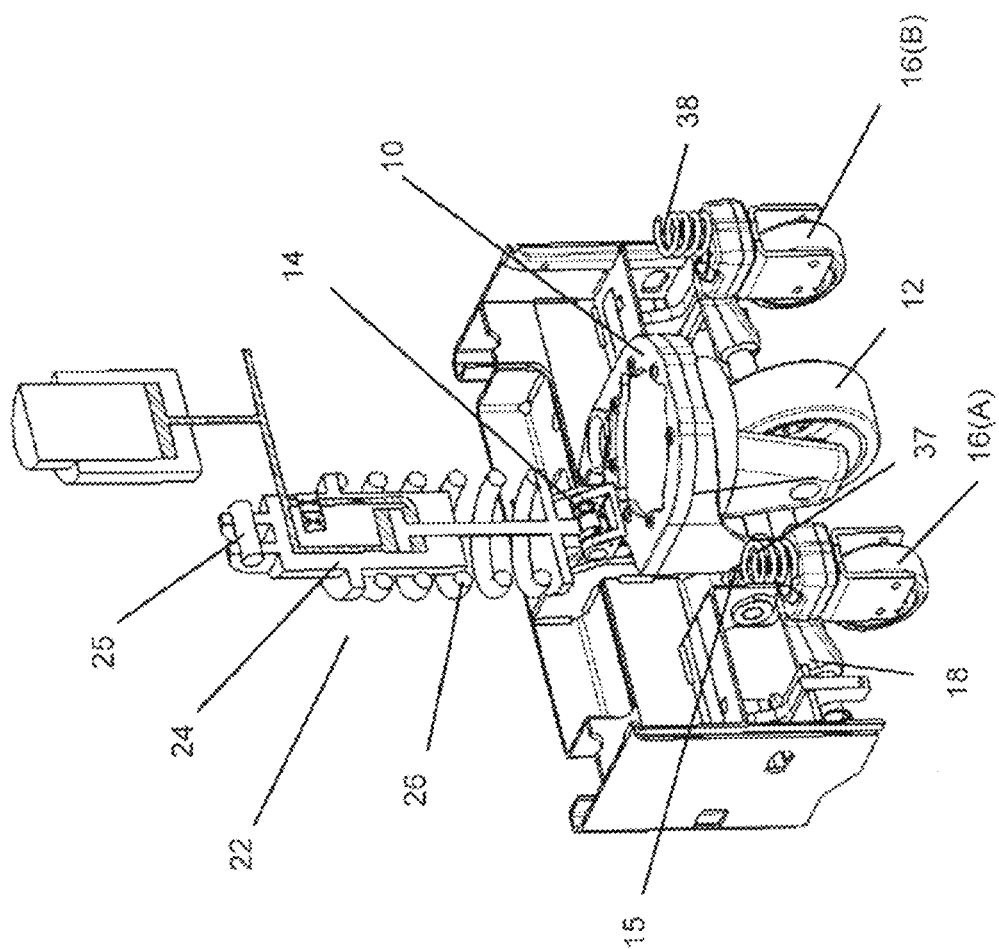
FIG. 2A illustrates a partial sectional view of the embodiment from FIG. 1 with an energized valve.
Figure 2B:
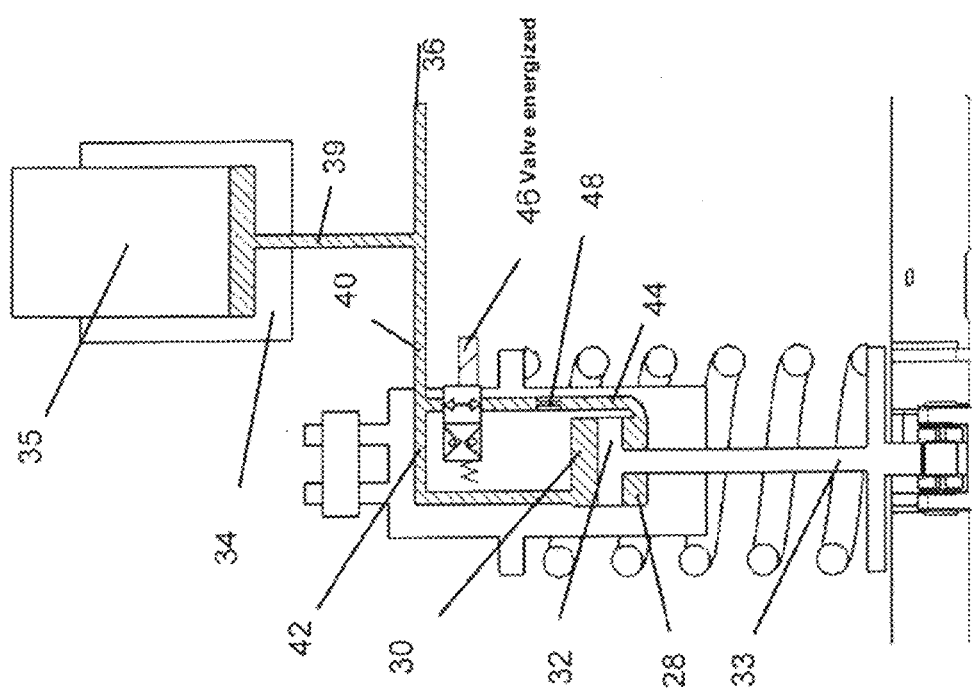
FIG. 2B illustrates a close-up view of a portion of FIG. 2A.

FIGS. 2A and 2B shows the same mechanical and hydraulic layout as in FIGS. 1A and 1B. The difference from FIGS. 1A and 1B is that the valve 46 is energized. As a result, the piston chamber 28 is also connected via the feedline 44 and the throttle 48 to the piston chamber 30. This means that the system pressure from the load lift cylinder 34 is applied to the two piston chambers 28 and 30. Accordingly, the force applied by the dual-acting hydraulic cylinder 24 to the drive unit 10 results from the system pressure of the load lift cylinder 34 at the feedline 40. The piston chambers 28 and 30 possess a different cross-sectional area so that a resulting piston ejection force arises even when the applied pressure in the piston chambers is the same. This results from the difference in area of the piston 32 to the piston chambers 30 and 28. In the shown embodiment, greater force is acting on the piston rod 33 in the direction of extension out of the hydraulic cylinder 24 since the effective cross-sectional area in the piston chamber 30 is greater than the effective cross-sectional area in the chamber 28. Vertical movements of the drive unit 10 result in a lifting of the piston rod 33, wherein the piston chamber 28 increases or decreases. When the valve 46 is open, the volume of oil displaced thereby flows through the throttle 48 that, depending on the embodiment, controls the lift speed of the piston rod 33 and therefore the vertical movement of the entire drive unit 10. The throttle can be designed so that the fluid flow is throttled equally in both directions. By using check diaphragms, different fluid speeds are also possible depending on the direction of flow. The extension speed of the piston rod 33 can accordingly be individually adjusted in both directions.

Figure 3:
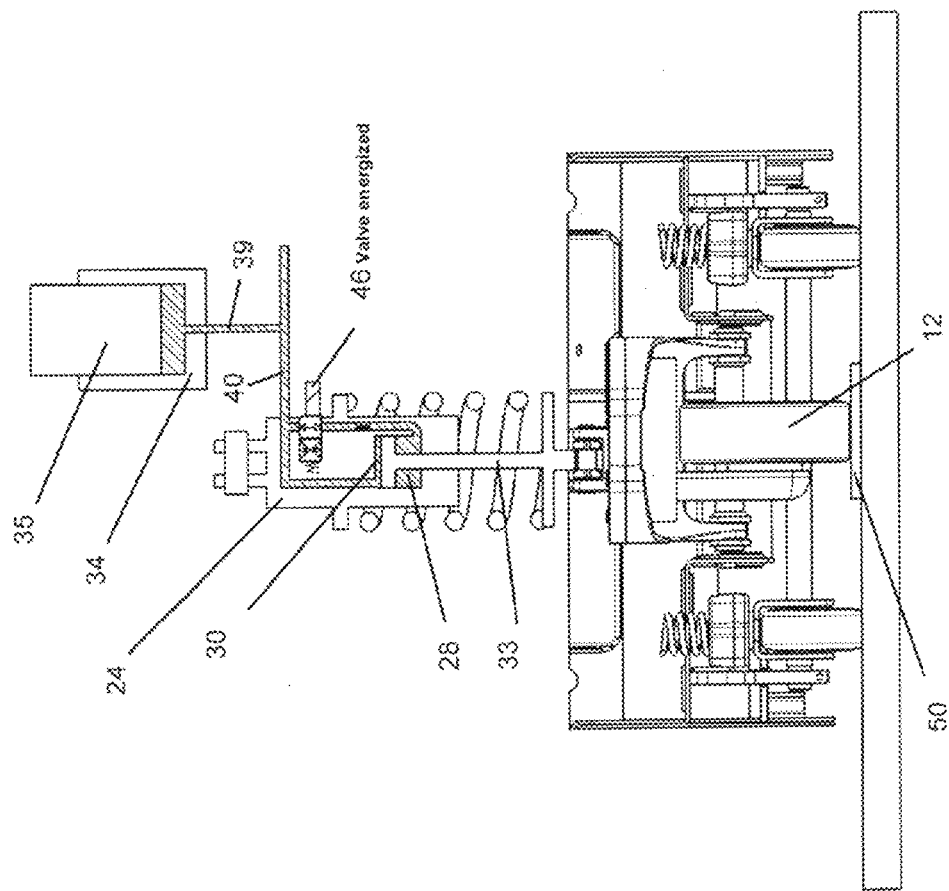
FIG. 3 illustrates the embodiment from FIG. 1 when traveling over a threshold with an energized valve.

FIG. 3 shows an example in which, in the configuration from FIGS. 2A and 2B, the drive wheel 12 of the vehicle is driving over a threshold 50. The drive wheel 12 is lifted in so doing, and the piston rod 33 enters into the hydraulic cylinder 24. This causes an enlargement of the piston chamber 28 while reducing the piston chamber 30. To accomplish this, the hydraulic fluid flows through the feedline 44, the energized valve 46, and the throttle unit 48 into the piston chamber 28. Since more fluid is displaced from the piston chamber 30 than the piston chamber 28 can accommodate, the excess fluid is fed via the lines 40 and 39 to the load lift cylinder 34 whose piston 35 extends by the corresponding lift.

Figure 4:
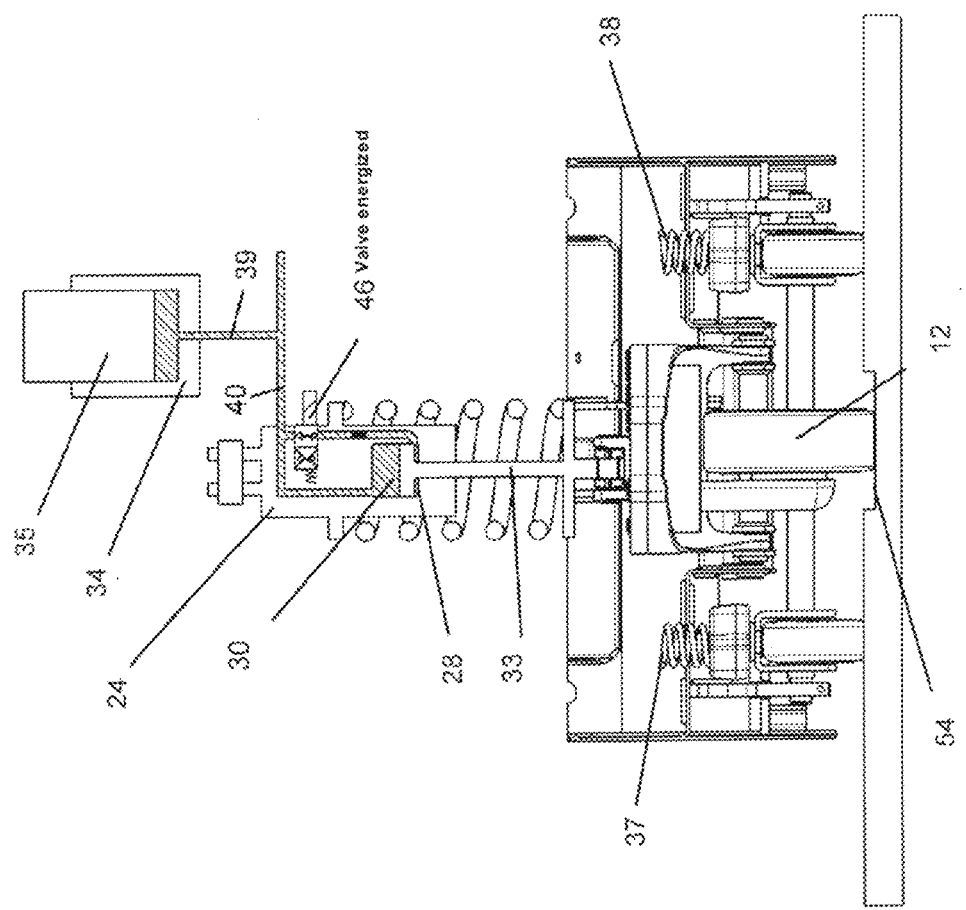
FIG. 4 illustrates the embodiment from FIG. 1 with an energized valve in a roadway dip.

FIG. 4 shows a situation corresponding to FIG. 3 in which the drive wheel 12 travels through a dip 54. The piston rod 33 then exits the hydraulic cylinder 24 corresponding to the depth of the dip, and the lift of the piston chamber 28 must therefore be tailored to the actual routine ground conditions. In this case as well, the movement of the drive wheel 12 is characterized by the properties of the throttle 48. The speed with which the hydraulic fluid can escape from the piston chamber 28 is determined by the throttle 48. The drive wheel load resulting from the hydraulic cylinder 24 does not change while driving over a threshold 50 or driving through a dip 54 as long as the system pressure of the load lift cylinder 34 acts in both chambers 28, 30 when the valve 46 is energized.

Figure 5:
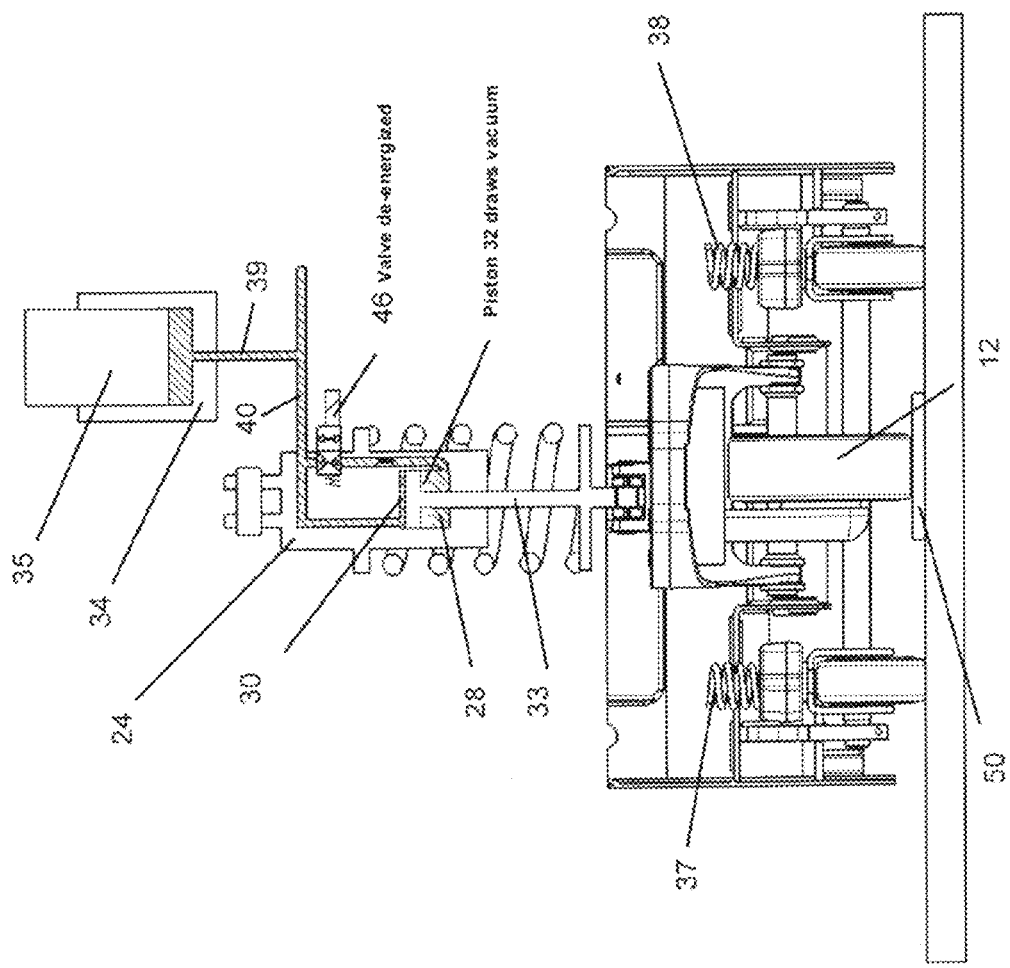
FIG. 5 illustrates the embodiment from FIG. 1 when traveling over a threshold with a de-energized valve.
Figure 6:
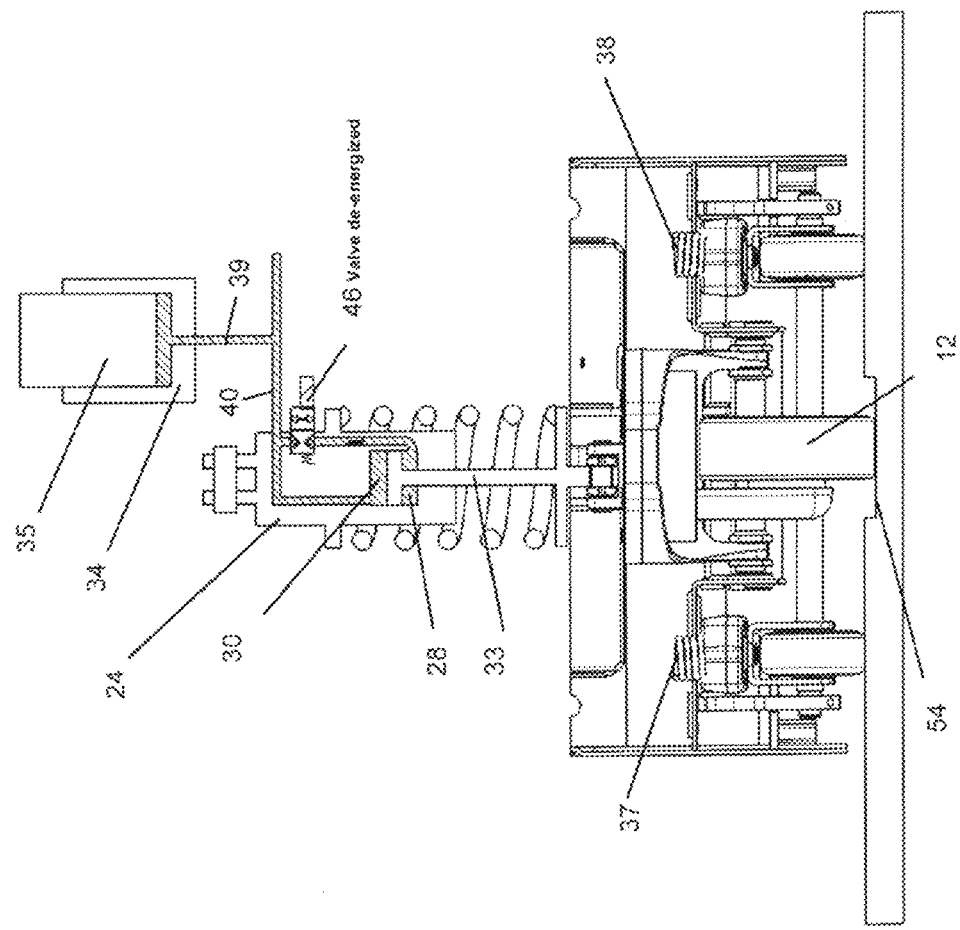
FIG. 6 illustrates the embodiment from FIG. 1 when traveling through a dip with a de-energized valve.

FIGS. 5 and 6 correspond to FIGS. 3 and 4 with the difference that the valve 46 is not energized. In FIG. 5, a threshold 50 is being driven over as in FIG. 3. The difference is that the valve 46 is de-energized in this case, and the chamber 28 is therefore blocked. The valve 46 is de-energized in the example from FIG. 5, for example, because a pallet is to be put away on a shelf level that is higher than 500 mm above the floor level; the term "high lift" is used above this lifting height. The high lift is an operating state that poses major demands on the tipping stability of the forklift chassis since, as the lift height of the payload increases, the vertical distance of the vehicle's overall center of gravity to the floor increases. According to a simplified model concept in machine dynamics, the vehicle's overall mass on which accelerations act from the three spatial axes is located in the vehicle's overall center gravity. Accordingly, as the vertical distance of the vehicle's overall center of gravity increases, the tilting moment resulting from the accelerations also increases which must be dissipated from the chassis components into the hall floor. In this case, the valve 46 is not open so that a blocked state is switched that prevents the piston rod 33 or the drive wheel 12 from extending, and therefore increases the lateral stability of the vehicle. Even though the blocked state is switched, the lift of the piston 32 can adapt to the obstacle 50, wherein the volume of the piston chamber 28 increases, and the volume of the other piston chamber 30 correspondingly decreases. An escape movement of the drive wheel 12 via the hydraulic cylinder therefore occurs in which the impact of the obstacle 50 is absorbed by the movement of the piston rod 33 and is not transmitted into the vehicle frame. As already described above, the chamber 28 does not receive any more hydraulic fluid, but rather increases its volume in that it "draws vacuum". The excess fluid from the piston chamber 30 is received by the load stroke cylinder 34. Since, in this driving situation, the spring element 26 is compressed further by the amount of the threshold height 50, its spring rate must be chosen to be as small as possible. This allows the drive wheel load to be nearly constant over the lift of the drive unit 10. Otherwise, premature tipping of the vehicle is possible despite a de-energized valve 46 since the spring element 26 can be enabled to extend the drive wheel 12 on the threshold when the spring rate is large. In a worst-case scenario, the piston chamber 28 resumes its original volume of the blocked state.

Of particular interest is the arrangement shown in FIG. 6 in which the drive wheel 12 enters into a dip 54. The switchable valve 46 is in its blocked state, for example because high lifting is occurring during a stacking process. Different than in the situation in FIG. 5, the drive unit 10 cannot enable a necessary movement of the drive wheel 12 into the dip 54. The volume of the piston chamber 28 cannot be reduced so that the piston rod 33 cannot extend further. This is where the spring deflection capacity of the support rollers 16 and the torsion bar 18 come into effect. These deflect and thereby ensure that the drive wheel 12 retains its traction capacity, and that there is sufficient ground contact so that control of the vehicle in terms of steering ability is never lost, and starting and braking with minimal slip is always possible.

In summary, it can be concluded that the considered driving situations of the obstacle 50 and dip 54 can be driven by the drive unit with sufficient traction, both when the valve is in a blocked state as well as when the valve is in a non-blocked state.

Figure 7:
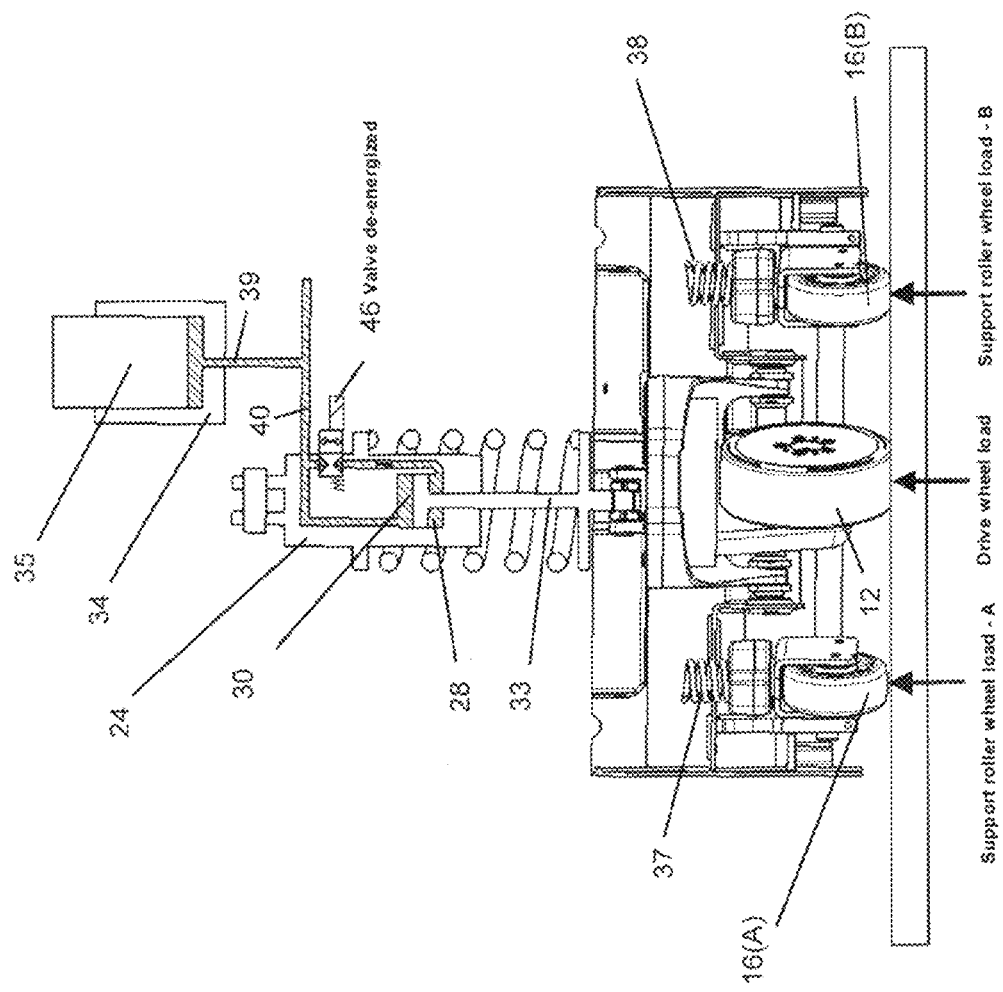
FIG. 7 illustrates the embodiment from FIG. 1 when negotiating a curve with a de-energized valve.

FIG. 7 shows the chassis adjustment for negotiating a curve to the left. The wheel load distribution FAR for the drive wheel 12 and FStA, FStB the support rollers 16A and 16B results from the following conditions: curve radius, driving speed, vehicle mass and vertical center of gravity position of the vehicle, as well as the energized state of the valve 46 and the selected spring constants of the spring elements 37 and 38 of the support roller suspension.

The valve 46 is de-energized, i.e., switched to the blocked state, when the steering angle of the drive wheel 12 deviates a few degrees from a predetermined value for straight-ahead driving. This means that an unblocked cylinder state exists only during a safe operating state in which, for example, there is no steering and/or the load carriage left does not exceed a certain height; otherwise, the valve 46 is blocked.

Figure 8:
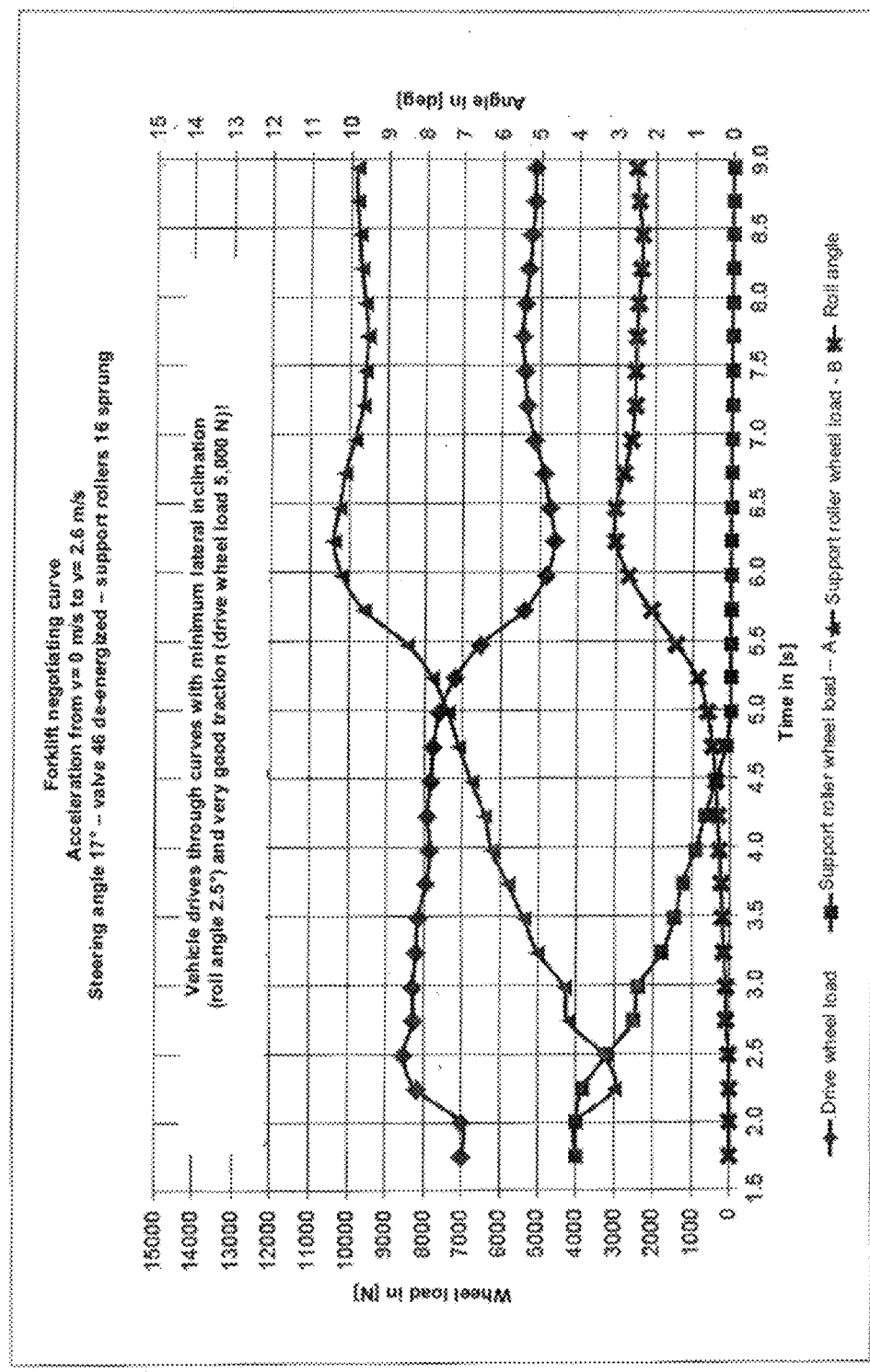
FIG. 8 illustrates a diagram of the embodiment from FIG. 7 showing the transient wheel loads when negotiating a curve with a de-energized valve.

FIG. 8 shows the transient state variables of the individual wheel loads for navigating a curve with a normal load in a diagram. The values originate from a multi-body simulation model. The vehicle accelerates at a constant steering angle of 17° from a standstill to v=2.6 m/s. It is revealed that the support roller 16A to the inside of the curve loses ground contact after about 5 s and is suspended in the air from that point. From this time on, the drive axle load is only distributed to the drive wheel and the support roller 16B, wherein in this example, the drive wheel bears about 5,000 N, and the support roller bears 10,000 N. The traction capability of the drive wheel with respect to negotiating a curve is enabled by the spring compression properties of the support roller 16B. The lateral stability of the vehicle characterized by the roll angle 2.5° results during this driving maneuver by blocking the ability of the drive wheel to extend.

Figure 9:
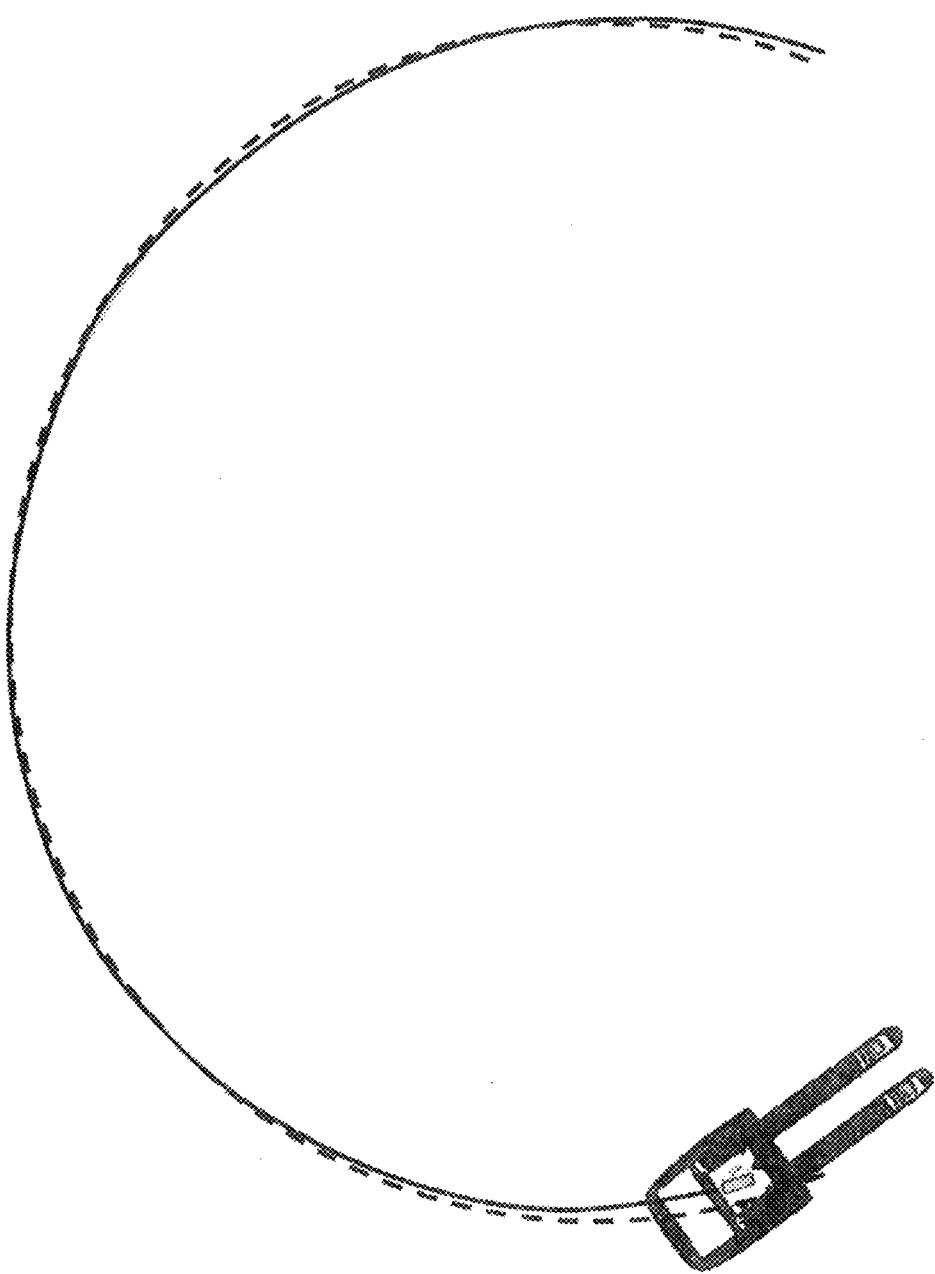
FIG. 9 schematically illustrates a locus of the drive wheel of the embodiment from FIG. 7 when negotiating a curve with a de-energized valve.
Figure 10:
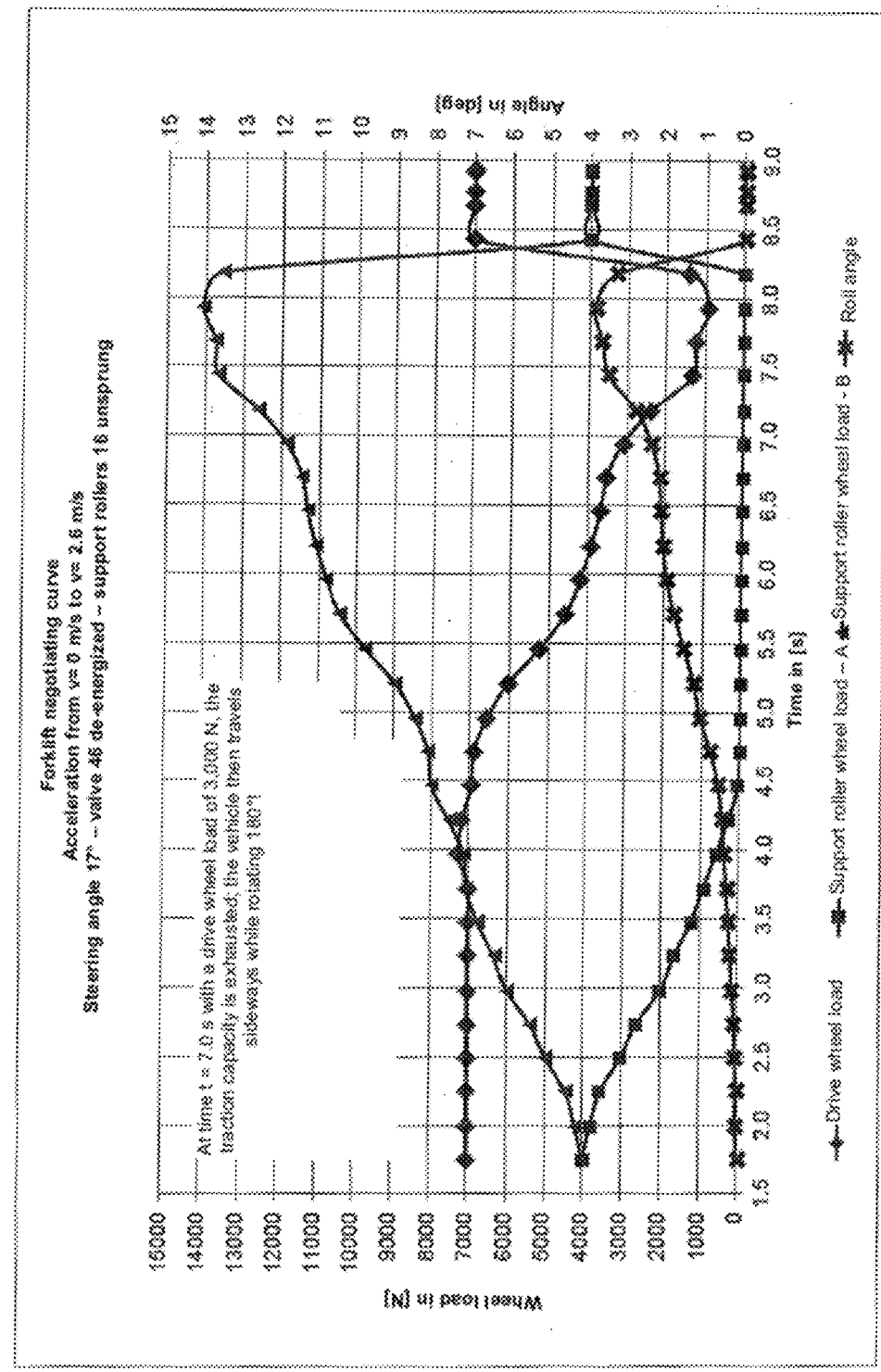
FIG. 10 illustrates a diagram of the embodiment from FIG. 7 showing the transient wheel loads when negotiating a curve with a de-energized valve but with rigid side support rollers.
Figure 11:
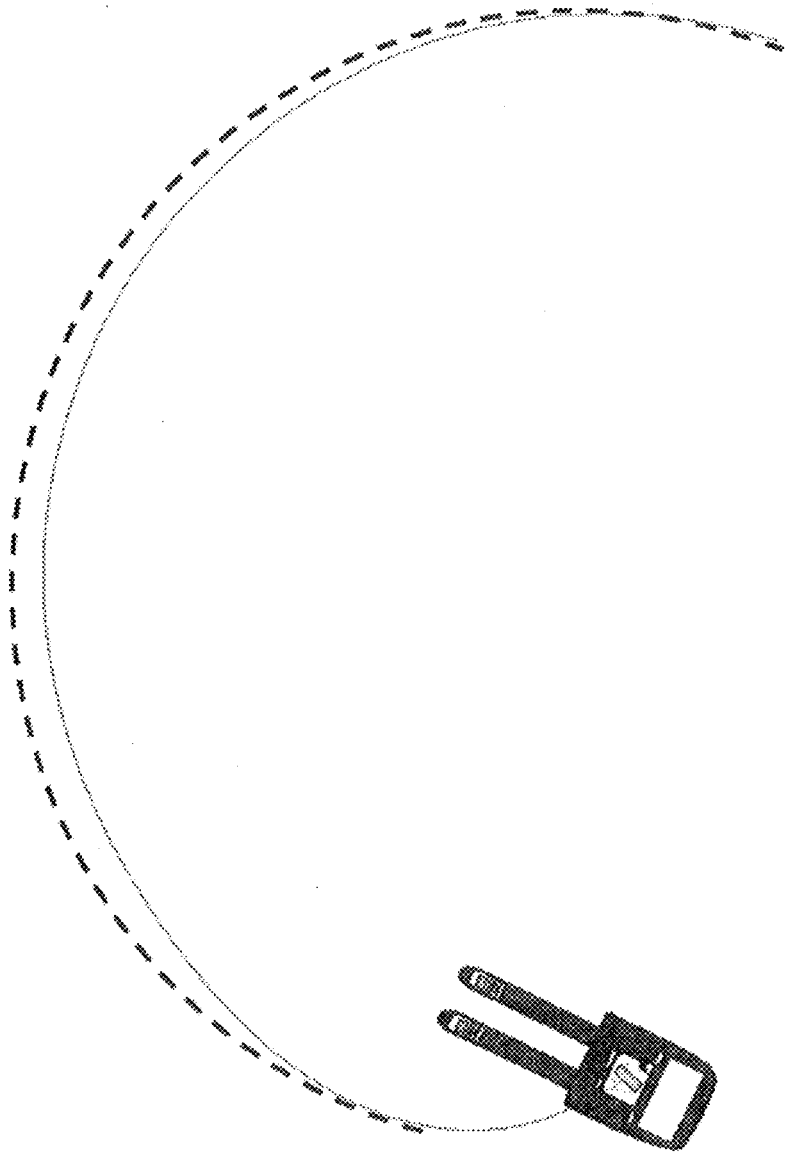
FIG. 11 schematically illustrates a locus of the drive wheel of the embodiment from FIG. 7 when negotiating a curve with a de-energized valve but with rigid side support rollers.

FIG. 9 shows the actual locus of the drive wheel center (solid line) of the simulation model and the arc of the theoretical expectation (dashed line) for the driving course. As one can see, the vehicle follows the given course, but with slight deviations. In order to be able to weight these course deviations, the support roller suspension was changed to rigid in the above-depicted driving maneuver. The results are shown in FIGS. 10 and 11. It was revealed that the drive wheel load decreases from 5,000 N to 1,000 N, and the support roller load B increases from 10,000 N to about 14,000 N. With a 1,000 N drive wheel load, the drive wheel transverse forces resulting from negotiating the curve can, however, no longer be transferred to the hall floor. As can clearly be seen in FIG. 11, the vehicle starts sliding laterally and rotates 180°.

Figure 12:
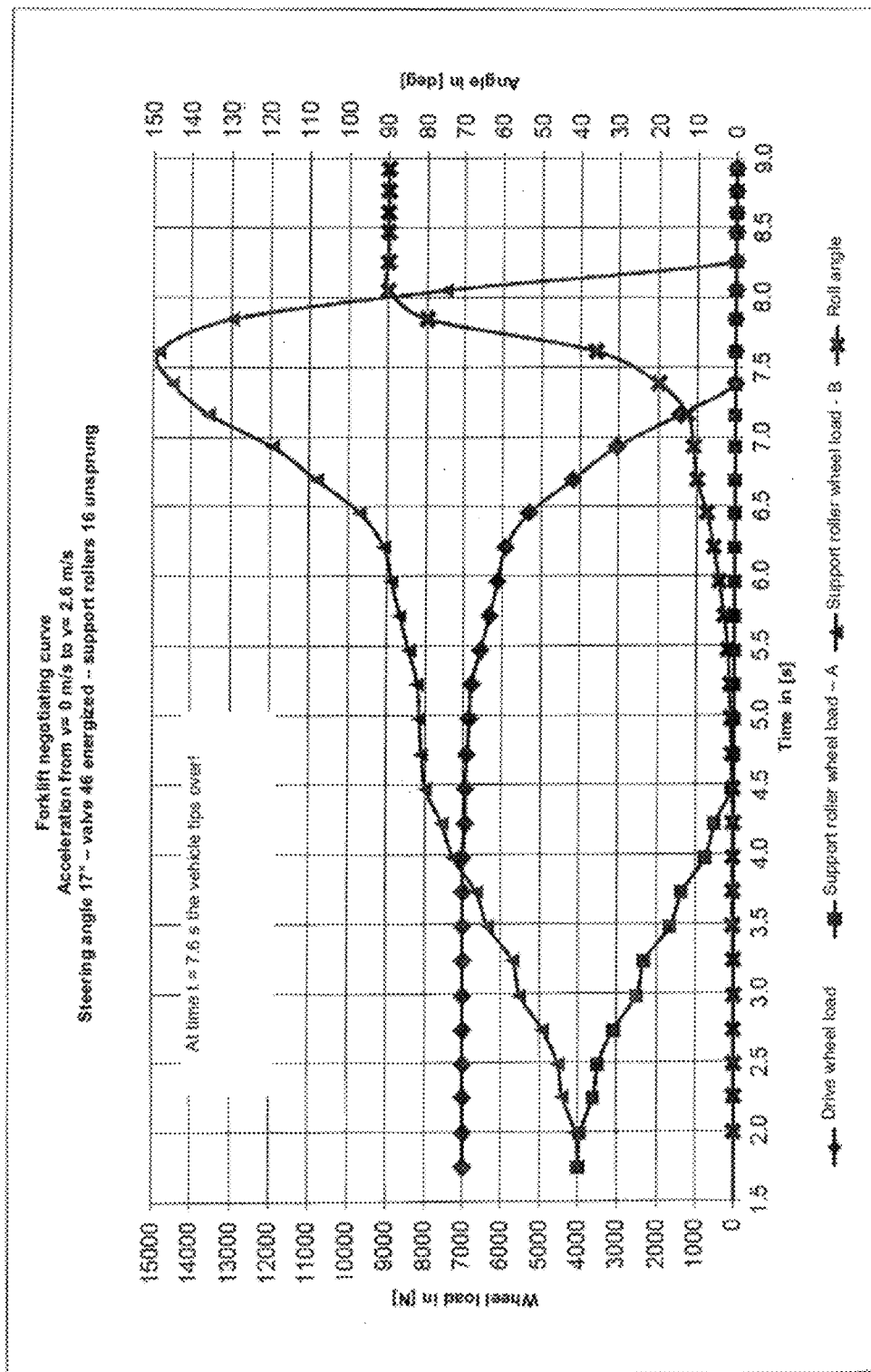
FIG. 12 illustrates a diagram of the embodiment from FIG. 7 showing the transient wheel loads when negotiating a curve but with an energized valve and with rigid side support rollers.
Figure 13:
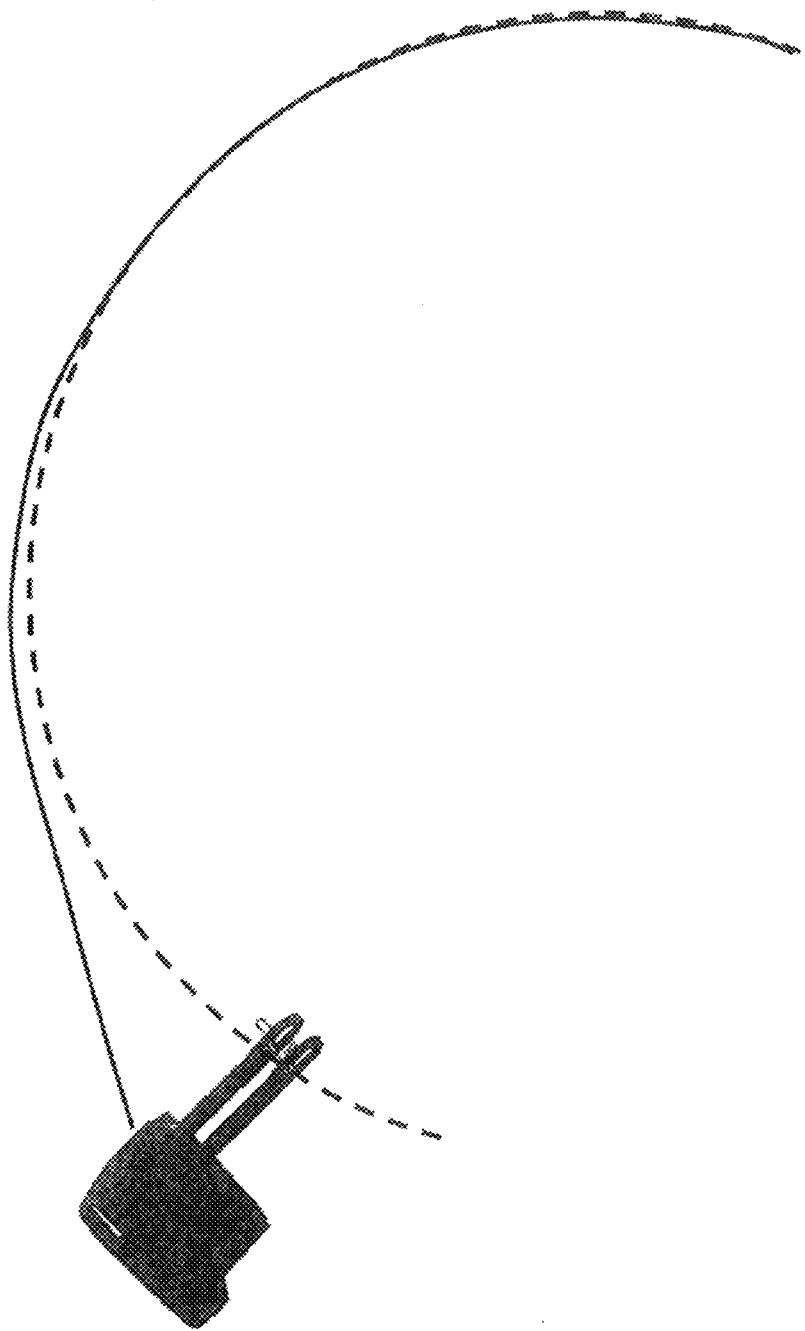
FIG. 13 schematically illustrates a locus of the drive wheel of the embodiment from FIG. 7 when negotiating a curve but with an energized valve and with rigid side support rollers.

The influence of blocking the cylinder is shown in FIGS. 12 and 13. The support roller suspension is also rigid in this case as well, and the valve 46 is continuously energized. In this case, the worst possible scenario occurs, the vehicle tips over!

Conclusion: The vehicle with the piston rod 33 blocking function in combination with sprung side support rollers is the only design that can satisfy the required driving task under the given conditions for negotiating a curve.

The above-described embodiment of the drive unit has a particular advantage in that it is unnecessary to sense an unstable driving state or correspondingly adapt a drive wheel pressure to improve the lateral stability.

In order to not have to sense operating states to actuate the valve 46 with respect to lateral stability, the blocked valve position is the basic setting for operating the industrial truck. In order to be able to safely operate the vehicle with sufficient traction even when the valve is closed, the drive unit is kept from hanging up on the locked hydraulic cylinder, and the drive wheel is kept from rotating freely in the air without ground contact. As explained above, sprung support rollers are used in this case instead of rigid support rollers, and their spring travel dictates, inter alia, the drivable dip depths. The spring constant of the support rollers is chosen such that minimal roll angles result while negotiating a curve, and the chassis behaves nearly like a four wheeler.

The valve 46 blocked in the basic setting can be opened for this purpose so that, when the ground profile changes, the pretension forces of the spring and chassis cylinder can readjust continuously. The safest vehicle operating range for this purpose is straight-ahead driving with lowered fork tines up to a transport height at which the driving behavior becomes unstable. The steering angle and the lift height of the payload are known in the vehicle control and can therefore be used to actuate the valve. When optimizing the traction and lateral stability, it was revealed that the use of these operating states (straight-ahead driving, transport height) yields the best results for valve actuation. A particularity is revealed when accelerating out of a small curve radius into straight-ahead driving. If the valve is opened too early in this case because the driving control considers the operating range safe in terms of driving dynamics solely due to the steering angle of around 0°, the vehicle can still enter into an unstable state. Consequently, the safe operating state must reliably exist before opening the valve to reset the drive wheel pressure. This can for example be determined by means of the duration, route, drive wheel rotations, and/or the speed.

REFERENCE SIGNS

10 Drive unit
12 Drive wheel
14 Parallel guide bars (top)
15 Parallel guide bars (bottom)
16 Support rollers (A left viewed in the direction of the forks, B correspondingly right)
18 Torsion bar
22 Spring unit
24 Dual-acting hydraulic cylinder
25 Connecting shaft
26 Spring element for drive unit 10
28 Piston chamber
30 Piston chamber
32 Piston
33 Piston rod
34 Load lift cylinder
35 Piston rod of the lift cylinder of the load lifting device
36 Pump and valve block for lift control
37 Spring element for torsion bar 18 (support wheel)
38 Spring element for torsion bar 18 (support wheel)
39 Feedline of the lift cylinder of the load lifting device
40 Feedline of the dual-acting cylinder of the spring unit
42 Feedline of the piston chamber 30
44 Feedline of the piston chamber 28
46 Switchable valve
48 Throttle
50 Threshold
54 Dip

The invention claimed is:

1. An industrial truck comprising:
a vehicle frame; and
a drive unit comprising,
 a drive wheel movably mounted to the vehicle frame, and
 a spring unit comprising,
  a hydraulic cylinder positioned between the vehicle frame and the drive unit, and
  a switchable valve configured to define a blocked state,
 wherein the spring unit is configured to pretension the drive wheel against a ground surface, and wherein when the switchable valve is in the blocked state, a one-sided movement of the hydraulic cylinder is blocked,
 wherein the hydraulic cylinder is configured as a dual-acting hydraulic cylinder defining a first piston chamber and a second piston chamber, and
 wherein when the switchable valve is in the blocked state, a reduction of a volume in a blocked piston chamber is prevented and an enlargement of the volume in the blocked piston chamber is enabled.

2. An industrial truck comprising:
a vehicle frame; and
a drive unit comprising,
 a drive wheel movably mounted to the vehicle frame, and
 a spring unit comprising,
  a hydraulic cylinder positioned between the vehicle frame and the drive unit, and
  a switchable valve configured to define a blocked state,
 wherein the spring unit is configured to pretension the drive wheel against a ground surface, and wherein when the switchable valve is in the blocked state, a one-sided movement of the hydraulic cylinder is blocked,
 wherein the hydraulic cylinder is configured as a dual-acting hydraulic cylinder defining a first piston chamber and a second piston chamber, and
 wherein a load-dependent system pressure is applied to at least one of the first and second piston chambers in at least a first operating state of the industrial truck.

3. The industrial truck according to claim 2, further comprising a throttle unit configured to control a flow of fluid into or out of one of the first and second piston chambers to dampen movement of a corresponding hydraulic cylinder piston.

4. The industrial truck according to claim 3, wherein the second piston chamber is connected to the first piston chamber by a connecting line, wherein the connecting line includes the throttle unit and the switchable valve.

5. The industrial truck according to claim 4, further comprising a lift cylinder configured to lift a load lifting means, wherein a system pressure is applied to the first piston chamber.

6. The industrial truck according to claim 2, wherein when the switchable valve is in the blocked state, a reduction of a volume in a blocked piston chamber is prevented and an enlargement of the volume in the blocked piston chamber is enabled.

7. The industrial truck according to claim 2, wherein the blocked state of the switchable valve is opened in at least a second operating state of the vehicle.

8. The industrial truck according to claim 2, wherein the first and second piston chambers define an area differential configured to generate a piston ejection force, wherein the piston ejection force generates a drive wheel load.

9. The industrial truck according to claim 2, wherein the hydraulic cylinder further comprises a mechanically pretensioned spring element, wherein an initial stress of the mechanically pretensioned spring element contributes to a drive load, and wherein the mechanically pretensioned spring element is parallel-connected to the hydraulic cylinder.

10. The industrial truck according to claim 2, further comprising at least one support roller operatively coupled to a support wheel spring, wherein a spring travel is determined by at least one of:
(1) a dip depth that can be traveled by the industrial truck, and
(2) a drive wheel pressure when navigating a curve.

11. The industrial truck according to claim 2, further comprising at least two support rollers mounted on a common torsion bar, wherein the common torsion bar is configured to be connected to the vehicle frame in a pivotable and vertically sprung manner.

12. An industrial truck comprising:
a vehicle control;
a drive wheel; and
a spring unit operatively coupled to the drive wheel and comprising,
 a hydraulic cylinder positioned between a vehicle frame and a drive unit, and
 a switchable valve configured to be actuated by the vehicle control to define a blocked state, wherein the hydraulic cylinder is configured as a dual-acting hydraulic cylinder defining a first piston chamber and a second piston chamber, wherein a load-dependent system pressure is applied to at least one of the first and second piston chambers in at least a first operating state of the industrial truck, and wherein the vehicle control is configured to open the switchable valve when the vehicle control recognizes a safe operating state, wherein the safe operating state is recognized by at least one of a below conditions: (1) a steering angle of the industrial truck does not exceed a predetermined value for straight-ahead driving; and (2) a lifting height of a load carrying means of the vehicle does not exceed a predetermined value of a transport height.

13. The industrial truck according to claim 12, wherein the vehicle control is configured to open the switchable valve when at least one of a below conditions exist:

(1) the safe operating state lasts for a predetermined minimum period;

(2) a predetermined minimum distance has been traveled;

(3) a predetermined number of drive wheel rotations has been sensed by the vehicle control; and (4) a predetermined speed has been undershot.

14. The industrial truck according to claim 12, wherein the blocked state of the switchable valve is opened in at least a second operating state of the vehicle.

15. The industrial truck according to claim 12, wherein the spring unit comprises a hydraulic cylinder configured as a dual-acting hydraulic cylinder and defining a first piston chamber and a second piston chamber.

16. The industrial truck according to claim 15, wherein the first and second piston chambers of the hydraulic cylinder are connected to each other by the switchable valve.

* * * * *